(12) United States Patent
Lee et al.

(10) Patent No.: US 11,435,505 B2
(45) Date of Patent: Sep. 6, 2022

(54) WAVELENGTH MULTIPLEXING DEVICE

(71) Applicants: Research & Business Foundation Sungkyunkwan University, Suwon-si (KR); Institute for Basic Science, Daejeon (KR)

(72) Inventors: Hyun Seok Lee, Hwaseong-si (KR); Young Hee Lee, Suwon-si (KR)

(73) Assignees: Research & Business Foundation Sungkyunkwan University, Suwon-si (KR); INSTITUTE FOR BASIC SCIENCE, Daejeon (KR)

( * ) Notice: Subject to any disclaimer, the term of this patent is extended or adjusted under 35 U.S.C. 154(b) by 162 days.

(21) Appl. No.: 16/888,955

(22) Filed: Jun. 1, 2020

(65) Prior Publication Data
US 2020/0292733 A1    Sep. 17, 2020

Related U.S. Application Data

(62) Division of application No. 15/455,492, filed on Mar. 10, 2017, now Pat. No. 10,712,479.

(30) Foreign Application Priority Data

Mar. 11, 2016    (KR) .......................... 10-2016-0029780

(51) Int. Cl.
G02B 5/00 (2006.01)
G02B 6/10 (2006.01)
G02B 6/122 (2006.01)
G02F 1/01 (2006.01)

(52) U.S. Cl.
CPC ............. *G02B 5/008* (2013.01); *G02B 6/107* (2013.01); *G02B 6/1226* (2013.01); *G02F 1/0102* (2013.01); *G02F 2203/10* (2013.01)

(58) Field of Classification Search
CPC ...... G02B 5/008; G02B 6/107; G02B 6/1226; G02F 1/0102; G02F 2203/10
(Continued)

(56) References Cited

U.S. PATENT DOCUMENTS

2018/0172908 A1*    6/2018    Bao ...................... G02B 6/1226

OTHER PUBLICATIONS

Lee et al. "Reconfigurable exciton-plasmon interconversion for nanophotonic circuits" Nature Communications, DOI: 10.1038/ncomms13663 (Year: 2016).* Rivera et al. "Observation of long-lived interlayer excitons in monolayer MoSe2-WSe2 heterostructures" Nature Communications, DOI: 10.1038/ncomms7242 (Year: 2015).*

(Continued)

*Primary Examiner* — George G. King
(74) *Attorney, Agent, or Firm* — NSIP Law

(57) ABSTRACT

A wavelength multiplexing device is disclosed. When light is irradiated on a first longitudinal end region of a metal nano-structure, surface plasmon polaritons are generated in the first longitudinal end region. The surface plasmon polaritons and the light are coupled with each other to form first coupled surface plasmon polaritons, wherein the first coupled surface plasmon polaritons propagate along and on a surface of the metal nano-structure. When the first coupled surface plasmon polaritons reach a two-dimensional material layer, excitons are induced in the two-dimensional material layer, wherein the induced excitons and the first coupled surface plasmon polaritons are coupled with each other to form second coupled surface plasmon polaritons. The second coupled surface plasmon polaritons propagate along and on a surface of the metal nano-structure toward a second longitudinal end thereof.

14 Claims, 6 Drawing Sheets

(58) Field of Classification Search
USPC ........ 257/5, E45.001, 109, 202, 204, 211, 2,
257/E23.025, E23.033, E27.151, 30, 40,
257/678, E23.01, E29.001, E29.042,
257/E29.179, E29.241, E29.323, E31.037,
257/E31.095, E33.067, E33.077, E39.012,
257/E49.001, E49.003, E51.045, 186,
257/199, 24, 25, 31, 32, 419, 438, 666,
257/672, 677, 786, 798, 82, 87, 9, 98;
250/208.2, 227.18, 227.23, 281, 282, 288,
250/458.1, 459.1, 483.1
See application file for complete search history.

(56) References Cited

OTHER PUBLICATIONS

Lee et al., "Efficient Exciton-Plasmon Conversion in Ag Nanowire/Monolayer $MoS_2$ Hybrids: Direct Imaging and Quantitative Estimation of Plasmon Coupling and Propagation," Advanced Optical Materials, vol. 3, Issue 7, pp. 943-947 (Year: 2015).
Goodfellow et al., "Integrated nanophotonics based on nanowire plasmons and atomically thin material," Optica, vol. 1, No. 3, pp. 149-152 and Supplementary Material pp. 1-4 (Year: 2014).
Ramasubramaniam et al., "Tunable band gaps in bilayer transition-metal dichalcogenides," Physical Review B, 84, pp. 205325-1-205325-10 (Year: 2011).
Osadciw, "Nanoscale photodetector shows promise to improve the capacity of photonic circuits," University of Rochester, New York, Oct. 5, 2015.

\* cited by examiner

WAVELENGTH MULTIPLEXING DEVICE

CROSS-REFERENCE TO RELATED APPLICATIONS

This application is a divisional of U.S. patent application Ser. No. 15/455,492 filed Mar. 10, 2017, which claims the benefit under 35 U.S.C. 119(a) of Korean Patent Application No. 10-2016-0029780 filed Mar. 11, 2016, in the Korean Intellectual Property Office, the disclosures of which are incorporated herein by reference for all purposes.

BACKGROUND

Field of the Invention

The present disclosure relates to a wavelength multiplexing device, and, more particularly, to a wavelength multiplexing device using coupling between SPPs (surface plasmon polaritons) generated from a metal nano-structure and excitons induced in a transition metal dichalcogenide-based compound.

Discussion of Related Art

Photonics with light manipulation meet the latest information technology needs for high-speed data processing. Conventionally, quantum dots (QDs) or quantum wells (QWs) have been widely used in optical communication. In this connection, a top-down approach wherein quantum dots are arranged in a series of arrays, and a quantum well growth for three-dimensional stacking are expensive and still need improvement. Further, short-life excitons have operational limits at low temperatures.

The wavelength conversion and multiplexing technique is intended for designing a reconfigurable optical communication system. Various methods for wavelength conversion have been developed in conventional optical communication technologies based on optical fibers and optical waveguides. Further, miniaturization of optical components for application in nano-electronics has allowed new fusion of optoelectronics. However, optical diffraction limitation is a fundamental obstacle with regards to reducing the size of optical devices to nanometers.

SUMMARY OF THE INVENTION

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

Surface plasmon polaritons (SPPs), that is, couplings between electromagnetic waves and electron plasma from a metal, have the potential to overcome the above optical diffraction limitation. This is because the surface plasmon polaritons allow localization of the light energy and thus light-guidance in an area of a size smaller than a wavelength of an interface between the metal and the dielectric. Therefore, the present disclosure is to provide a wavelength multiplexing device to overcome the optical diffraction limitation using SSPs (surface plasmon polaritons).

In this connection, the present disclosure is to provide a wavelength multiplexing device using coupling between SPPs (surface plasmon polaritons) generated from a metal nano-structure using a light source and excitons induced in a transition metal dichalcogenide-based compound.

In a first aspect of the present disclosure, there is provided a wavelength multiplexing device comprising: a two-dimensional material layer made of a semiconductor material; an elongate metal nano-structure having first and second opposing longitudinal ends, wherein the first longitudinal end thereof is spaced from the two-dimensional material layer, and the elongate metal nano-structure is partially disposed on the two-dimensional material layer; a light source configured to irradiate light onto the first longitudinal end region of the metal nano-structure, wherein when the light is irradiated on the first longitudinal end region of the metal nano-structure, surface plasmon polaritons are generated in the first longitudinal end region, wherein the surface plasmon polaritons and the light are coupled with each other to form first coupled surface plasmon polaritons, wherein the first coupled surface plasmon polaritons propagate along and on a surface of the metal nano-structure, wherein when the first coupled surface plasmon polaritons reach the two-dimensional material layer, excitons are induced in the two-dimensional material layer, wherein the induced excitons and the first coupled surface plasmon polaritons are coupled with each other to form second coupled surface plasmon polaritons, wherein the second coupled surface plasmon polaritons propagate along and on a surface of the metal nano-structure toward the second longitudinal end thereof.

In one embodiment of the first aspect, the light has a first wavelength, wherein each of the excitons has a second wavelength different from the first wavelength.

In one embodiment of the first aspect, the second coupled surface plasmon polaritons are decoupled at the second longitudinal end of the metal nano-structure into first light with the first wavelength and second light with the second wavelength.

In one embodiment of the first aspect, the device further comprises a semiconductor substrate having an insulating film formed thereon, wherein the two-dimensional material layer is disposed on the insulating film.

In one embodiment of the first aspect, the insulating film is made of silicon dioxide ($SiO_2$), and the semiconductor substrate is formed of a silicon (Si) wafer.

In one embodiment of the first aspect, a voltage is applied to the substrate.

In one embodiment of the first aspect, an amount of the induced excitons is adjusted by the voltage applied to the substrate.

In one embodiment of the first aspect, the two-dimensional material layer is electrically grounded.

In one embodiment of the first aspect, the metal nano-structure includes a metal nano-wire.

In one embodiment of the first aspect, the two-dimensional material layer is in a form of a thin film having an atomic layer thickness.

In one embodiment of the first aspect, the semiconductor material includes at least one selected from a group consisting of a transition metal dichalcogenide-based compound, a chalcogenide-based semiconductor compound, a phosphorus-containing chalcogenide-based semiconductor compound, and a phosphorus-containing semiconductor compound.

In a second aspect of the present disclosure, there is provided a wavelength multiplexing device comprising: a first material layer made of a first semiconductor material; a second material layer made of a second semiconductor material, wherein the first material layer is spaced from the second material layer; an elongate metal nano-structure having first and second opposing longitudinal ends, wherein the elongate metal nano-structure extends across and on the first and second material layers; a light source configured to irradiate light onto a first region of the metal nano-structure, wherein the first region overlaps the first material layer, wherein when the light is irradiated on the first region of the metal nano-structure, surface plasmon polaritons are generated on the first region of the metal nano-structure, and first excitons are induced in the first material layer, wherein the surface plasmon polaritons and the first excitons are coupled with each other to form first coupled surface plasmon polaritons, wherein the first coupled surface plasmon polaritons propagate along and on a surface of the metal nano-structure, wherein when the first coupled surface plasmon polaritons reach the second material layer, second excitons are induced in the second material layer, wherein the second excitons and the first coupled surface plasmon polaritons are coupled with each other to form second coupled surface plasmon polaritons, wherein the second coupled surface plasmon polaritons propagate along and on a surface of the metal nano-structure.

In one embodiment of the second aspect, each of the first excitons has a first wavelength, wherein each of the second excitons has a second wavelength different from the first wavelength.

In one embodiment of the second aspect, the second coupled surface plasmon polaritons are decoupled at one of the first and second longitudinal ends of the metal nano-structure into first light with the first wavelength and second light with the second wavelength.

In one embodiment of the second aspect, the device further comprises a semiconductor substrate having an insulating film formed thereon, wherein the first and second material layers are disposed on the insulating film.

In one embodiment of the second aspect, a voltage is applied to the substrate.

In one embodiment of the second aspect, each of the first and second layers is electrically grounded.

In one embodiment of the second aspect, an amount of the induced first and/or second excitons is adjusted by the voltage applied to the substrate.

In one embodiment of the second aspect, each of the first and second material layer is in a form of a thin film having an atomic layer thickness.

In one embodiment of the second aspect, each of the first and second semiconductor material includes at least one selected from a group consisting of a transition metal dichalcogenide-based compound, a chalcogenide-based semiconductor compound, a phosphorus-containing chalcogenide-based semiconductor compound, and a phosphorus-containing semiconductor compound.

In a third aspect of the present disclosure, there is provided a wavelength multiplexing device comprising: a first material layer made of a first semiconductor material; a second material layer made of a second semiconductor material, wherein the second material layer is disposed on the first material layer; an elongate metal nano-structure having first and second opposing longitudinal ends, wherein the elongate metal nano-structure is partially disposed on the second material layer; a light source configured to irradiate light onto a first region of the metal nano-structure, wherein the first region overlaps the first and second material layers, wherein when the light is irradiated on the first region of the metal nano-structure, surface plasmon polaritons are generated on the first region of the metal nano-structure, first excitons are induced in the first material layer, and second excitons are induced in the second material layer, wherein the surface plasmon polaritons are coupled with the first and second excitons to form first coupled surface plasmon polaritons, wherein the first coupled surface plasmon polaritons propagate along and on a surface of the metal nano-structure.

In one embodiment of the third aspect, each of the first excitons has a first wavelength, wherein each of the second excitons has a second wavelength different from the first wavelength.

In one embodiment of the third aspect, the first coupled surface plasmon polaritons are decoupled at one of the first and second longitudinal ends of the metal nano-structure into first light with the first wavelength and second light with the second wavelength.

In one embodiment of the third aspect, each of the first and second material layer is in a form of a thin film having an atomic layer thickness.

In one embodiment of the third aspect, each of the first and second semiconductor material includes at least one selected from a group consisting of a transition metal dichalcogenide-based compound, a chalcogenide-based semiconductor compound, a phosphorus-containing chalcogenide-based semiconductor compound, and a phosphorus-containing semiconductor compound.

In a fourth aspect of the present disclosure, there is provided a wavelength multiplexing device comprising: a first material layer made of a first semiconductor material; a second material layer made of a second semiconductor material, wherein the first material layer is spaced from the second material layer; a third material layer made of a third semiconductor material, wherein the third material layer is spaced from the second material layer, and the second material layer is disposed between the first and third material layers; an elongate metal nano-structure having first and second opposing longitudinal ends, wherein the elongate metal nano-structure extends across and on the first, second and third material layers; a light source configured to irradiate light onto a first region of the metal nano-structure, wherein the first region overlaps the first material layer, wherein when the light is irradiated on the first region of the metal nano-structure, surface plasmon polaritons are generated on the first region of the metal nano-structure, and first excitons are induced in the first material layer, wherein the surface plasmon polaritons and the first excitons are coupled with each other to form first coupled surface plasmon polaritons, wherein the first coupled surface plasmon polaritons propagate along and on a surface of the metal nano-structure, wherein when the first coupled surface plasmon polaritons reach the second material layer, second excitons are induced in the second material layer, wherein the second excitons and the first coupled surface plasmon polaritons are coupled with each other to form second coupled surface plasmon polaritons, wherein the second coupled surface plasmon polaritons propagate along and on a surface of the metal nano-structure, wherein when the second coupled surface plasmon polaritons reach the third material layer, third excitons are induced in the third material layer, wherein the third excitons and the second coupled surface plasmon polaritons are coupled with each other to form third coupled surface plasmon polaritons, wherein the third coupled surface plasmon polaritons propagate along and on a surface of the metal nano-structure.

In one embodiment of the fourth aspect, a voltage is applied to each of the first, second, and third material layers.

In one embodiment of the fourth aspect, each of the first excitons has a first wavelength, wherein each of the second excitons has a second wavelength different from the first wavelength, wherein each of the third excitons has a third wavelength different from the first and second wavelengths.

In one embodiment of the fourth aspect, an amount of the induced first, second and/or third excitons is adjusted by the voltage.

In one embodiment of the fourth aspect, the metal nanostructure has a protective coating formed on a surface thereof.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

Figure 1:
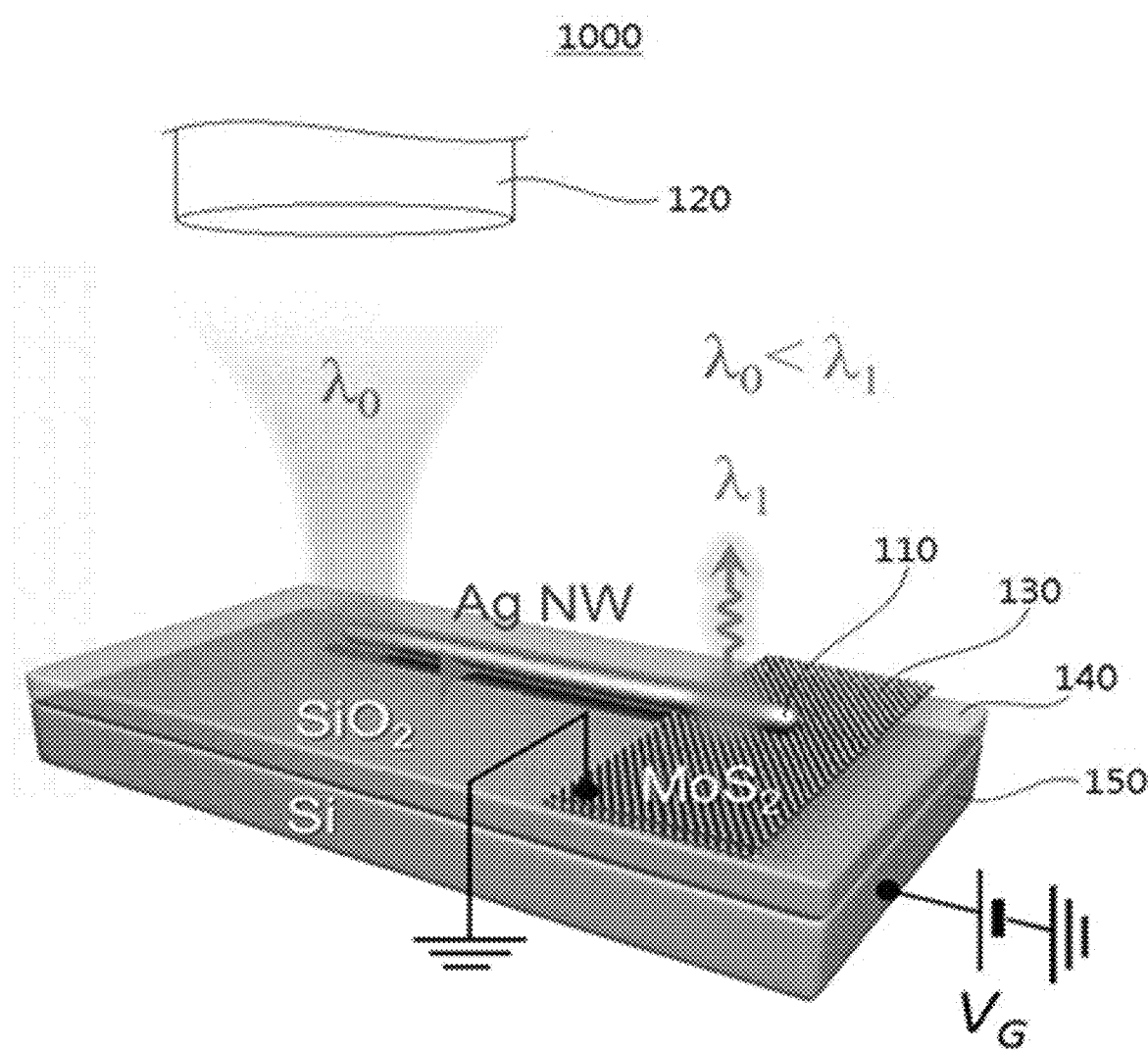
FIG. 1 is a conceptional view for illustrating a wavelength multiplexing device in accordance with one embodiment of the present disclosure.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

DETAILED DESCRIPTION OF THE INVENTION

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure."

As used herein and used on many papers and articles, terms such as surface plasmas (SPs), surface plasma waves, surface electromagnetic waves, surface polaritons, surface plasmon polaritons (SPPs), plasmon surface polaritons (PSPs) all may refer to electromagnetic waves excited in the metal surface.

The plasmon phenomenon refers to a phenomenon in which the free electrons in a metal collectively resonate due to external electromagnetic field applied thereto, and, thus, an electromagnetic field around the metal is locally enhanced due to the oscillation.

FIG. 1 is a conceptional view for illustrating a wavelength multiplexing device in accordance with one embodiment of the present disclosure. Referring to FIG. 1, a wavelength multiplexing device 1000 may include a metal nano-structure 110, a light source 120, a two-dimensional material layer 130, an insulating film 140 and a semiconductor substrate 150.

In one example, the metal nano-structure 110 may be embodied as silver (Ag) nano-wires. However, the present disclosure is not limited thereto. Various metals may be employed for the nano-wires. In one example, the metal nano-structure 110 may be embodied as metal nano-rods.

The light source 120 may emit laser which may be incident on a first longitudinal end region of the metal nano-structure 110. A first longitudinal end of the metal nano-structure 110 may refer to one of both opposing longitudinal ends of the metal nano-structure 110. In this connection, the first longitudinal end region may refer to an area adjacent to the first longitudinal end. The light from the light source 120 may cause electron oscillation in the metal nano-structure 110 to generate surface plasmon polaritons. When the light from the metal nano-structure 110 encounters the first longitudinal end region, the light may be scattered there.

When the surface plasmon polaritons may be generated in the first longitudinal end region, the surface plasmon polaritons and the light are coupled with each other to form first coupled surface plasmon polaritons which, in turn, may propagate on and along the surface of the metal nano-structure 110.

The two-dimensional material layer 130 may be made of a semiconductor material in which excitons may be induced. The two-dimensional material layer 130 may be spaced from the first longitudinal end of the metal nano-structure 110. In one example, an insulating film 140 may be formed on a semiconductor substrate 150, and the two-dimensional material layer 130 may be disposed on the insulating film 140. The metal nano-structure 110 may be partially disposed on the two-dimensional material layer 130. In one example, the metal nano-structure 110 may partially extend across and on the two-dimensional material layer 130. The two-dimensional material layer 130 may be in the form of a thin film having an atomic layer thickness. The semiconductor material may include at least one selected from a group consisting of a transition metal dichalcogenide-based compound, a chalcogenide-based semiconductor compound, a phosphorus-containing chalcogenide-based semiconductor compound, and a phosphorus-containing semiconductor compound. For example, the two-dimensional material layer 130 may be made of, but may be not limited to, tungsten disulfide ($WS_2$), tungsten diselenide ($WSe_2$), or molybdenum disulfide ($MoS_2$). The two-dimensional material layer 130 may be electrically grounded, while a voltage may be applied to the semiconductor substrate 150.

The first coupled surface plasmon polaritons propagating along and on the surface of the metal nano-structure 110 may induce excitons in the two-dimensional material layer 130. Thus, the induced excitons and the first coupled surface plasmon polaritons may be coupled with each other. The amount of the induced excitons may be controlled by the voltage (Vg) applied to the semiconductor substrate 150. In this connection, when the voltage (Vg) is applied to the semiconductor substrate 150, excess carriers are doped into the two-dimensional material layer 130, and, thus, the amount of the induced excitons may be adjusted by the carrier doping amount. The amount of the excitons for switching information can be adjusted based on the electrical doping.

The light from the light source 120 may have a first wavelength $\lambda_0$ and the induced exciton may have a second wavelength $\lambda_1$ different from the first wavelength $\lambda_0$. Those different wavelengths may be multiplexed via the coupling process. In one example, the second wavelength may be greater than the first wavelength. The second wavelength $\lambda_1$ may be determined by the bandgap of the two-dimensional material layer 130. Therefore, it is possible to change the second wavelength $\lambda_1$ by changing the kind of the transition metal dichalcogenide-based compound forming the two-dimensional material layer 130.

The excitons and the first coupled surface plasmon polaritons may be coupled with each other to generate the second coupled surface plasmon polaritons, which in turn, may propagate along the surface of the metal nano-structure 110. In this connection. The second coupled surface plasmon polaritons may propagate along the surface of the metal nano-structure 110 while different wavelengths thereof are multiplexed. Thus, the second coupled surface plasmon polaritons may be scattered on the second longitudinal end of the metal nano-structure to be decoupled into first light with the first wavelength and second light with the second wavelength. Thus, the second coupled surface plasmon polaritons may be de-multiplexed into the first light with the first wavelength and the second light with the second wavelength. In this way, the first light with the first wavelength and second light with the second wavelength may be collected individually. The collected first light with the first wavelength and second light with the second wavelength may be employed for corresponding communications.

Figure 2A:
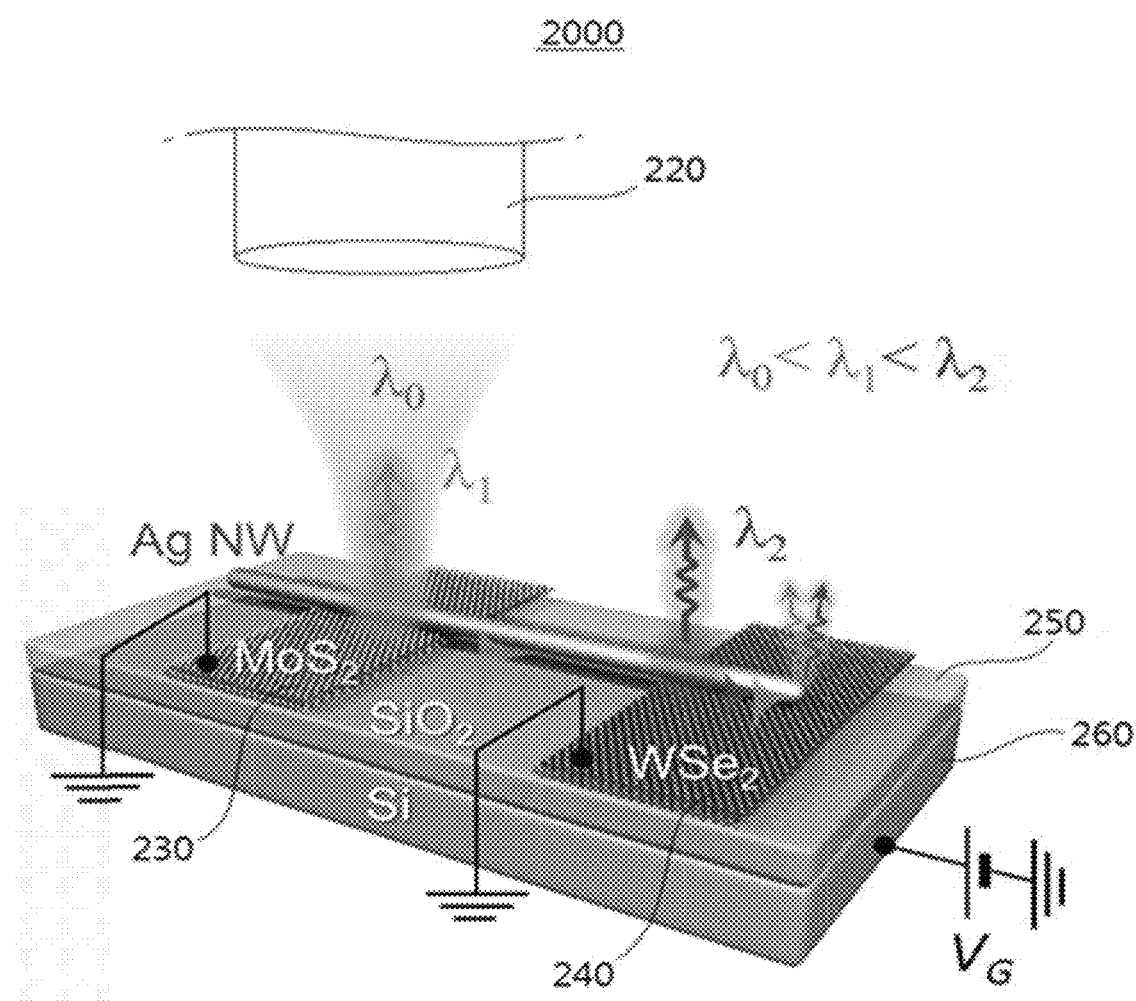
FIG. 2A is a conceptional view for illustrating a wavelength multiplexing device in accordance with one embodiment of the present disclosure.
Figure 2B:
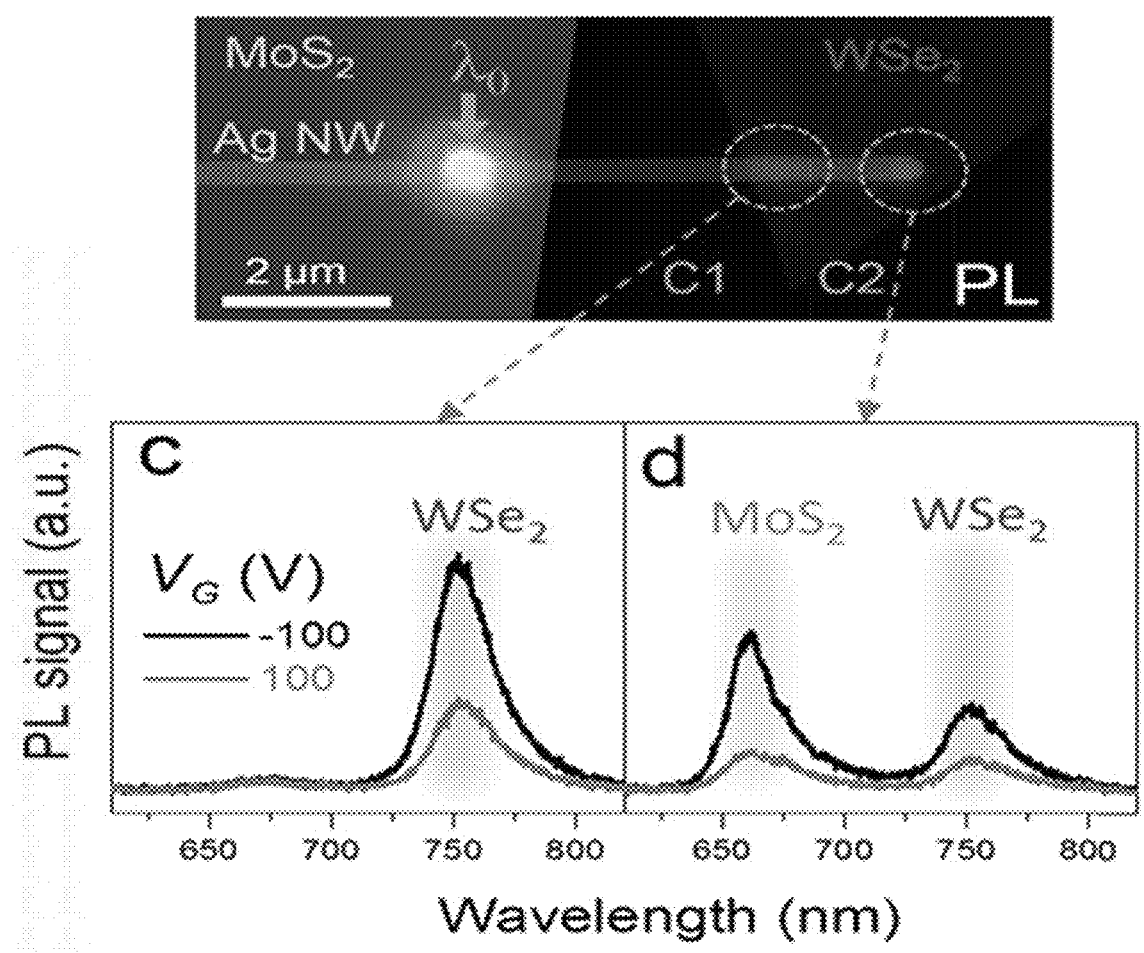
FIG. 2B shows a photoluminescence (PL) image for the wavelength multiplexing device in FIG. 2A and a graph of a photoluminescence signal (PL signal) based on a wavelength for the wavelength multiplexing device in FIG. 2A.

FIG. 2A is a conceptional view for illustrating a wavelength multiplexing device in accordance with one embodiment of the present disclosure. FIG. 2B shows a photoluminescence (PL) image for the wavelength multiplexing device in FIG. 2A and a graph of a photoluminescence signal (PL signal) based on a wavelength for the wavelength multiplexing device in FIG. 2A.

Referring to FIG. 2A, a wavelength multiplexing device 2000 may include a metal nano-structure 210, a light source 220, a first material layer 230, a second material layer 240, an insulating film 250, and a semiconductor substrate 260.

Each of the first material layer 230 and second material layer 240 may be made of a semiconductor material in which excitons may be induced therein. The first material layer 230 and second material layer 240 may be spaced from each other. The semiconductor material may include at least one selected from a group consisting of a transition metal dichalcogenide-based compound, a chalcogenide-based semiconductor compound, a phosphorus-containing chalcogenide-based semiconductor compound, and a phosphorus-containing semiconductor compound. For example, the first material layer 230 may be made of molybdenum disulfide (MoS$_2$) while the second material layer 240 may be made of tungsten diselenide (WSe$_2$). However, the present disclosure may be limited thereto. Each of the first material layer 230 and second material layer 240 may be electrically grounded, while a voltage may be applied to the semiconductor substrate 260. Each of the first material layer 230 and second material layer 240 may be in the form of a thin film having an atomic layer thickness.

The metal nano-structure 210 may be disposed on the first material layer 230 and the second material layer 240. In one example, the metal nano-structure 210 may be embodied as silver (Ag) nano-wires. However, the present disclosure is not limited thereto. Various metals may be employed for the nano-wires. In one example, the metal nano-structure 210 may be embodied as metal nano-rods. The first material layer 230 and the second material layer 240 may be disposed on the insulating film 250 on the substrate 260. The metal nano-structure 210 may extend across the first material layer 230 and the second material layer 240. A voltage may be applied to the semiconductor substrate 260. One or more of the amounts of first excitons and second excitons as will be described later may be controlled by the voltage applied to the semiconductor substrate 150.

The light source 220 may emit laser light with a wavelength $\lambda_0$ which in turn, may be incident on a first region of the metal nano-structure 210 wherein the first region may overlap the first material layer 230. The laser light may induce the first excitons in the first material layer 230 and may generate surface plasmon polaritons in the first region. Then, the first excitons and surface plasmon polaritons may be coupled with each other in the first region to form first coupled surface plasmon polaritons which in turn, may propagate along the surface of the metal nano-structure 210.

Then, the first coupled surface plasmon polaritons may be absorbed by the second material layer 240 and, thus, the second excitons may be induced in the second material layer 240. Then, the second excitons and first coupled surface plasmon polaritons may be coupled with each other to form second coupled surface plasmon polaritons which in turn, may propagate along the surface of the metal nano-structure. In one example, each of the first excitons may have a first wavelength $\lambda_1$, while each of the second excitons may have a second wavelength $\lambda_2$ different from the first wavelength. In one example, the second wavelength may be larger than the first wavelength.

The second coupled surface plasmon polaritons may propagate along the surface of the metal nano-structure 210 while different wavelengths thereof are multiplexed. Thus, the second coupled surface plasmon polaritons may be scattered on a longitudinal end of the metal nano-structure 210 to be decoupled into first light with the first wavelength and second light with the second wavelength. Thus, the second coupled surface plasmon polaritons may be demultiplexed into the first light with the first wavelength and the second light with the second wavelength. In this way, the first light with the first wavelength and second light with the second wavelength may be collected individually. The collected first light with the first wavelength and second light with the second wavelength may be employed for corresponding communications.

Referring to FIG. 2B, the wavelength $\lambda_0$ may refer to a wavelength of the laser from the light source 220. $C_1$ and $C_2$ may refer to concentrations of the photoluminescence signal. The photoluminescence spectra (de-multiplexed) for the wavelength $\lambda_1$ of the first exciton induced in the first material layer 230 made of molybdenum disulfide (MoS$_2$) and the wavelength $\lambda_2$ of the second exciton induced in the second material layer 240 made of tungsten diselenide (WSe$_2$) respectively may be observed in the C2 area (the longitudinal end of the elongate nano-structure 210). Thus, the multiplexed first and second excitons may be de-multiplexed in the C2 area. In the C1 area, the first and second excitons may be multiplexed with each other.

Figure 3A:
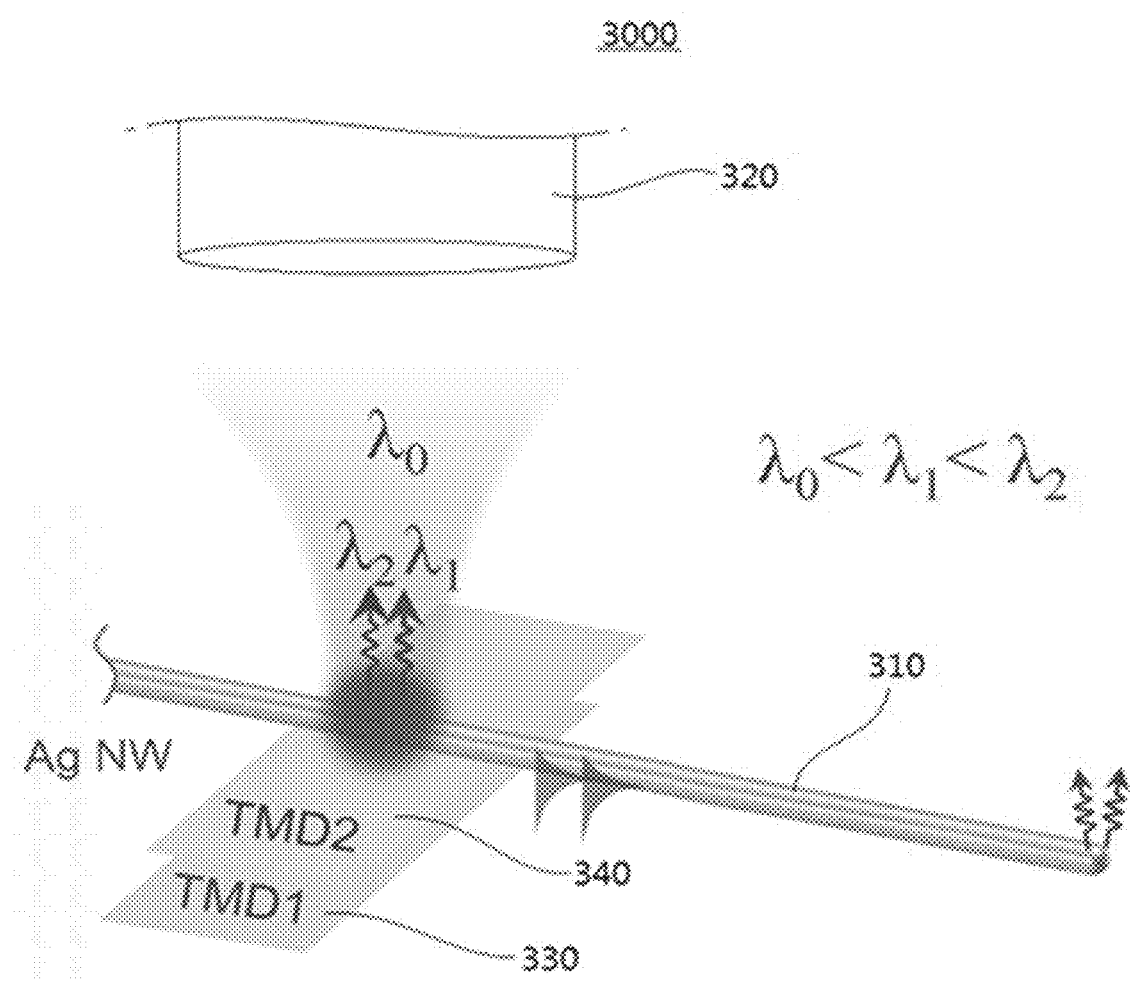
FIG. 3A is a conceptional view for illustrating a wavelength multiplexing device in accordance with one embodiment of the present disclosure.
Figure 3B:
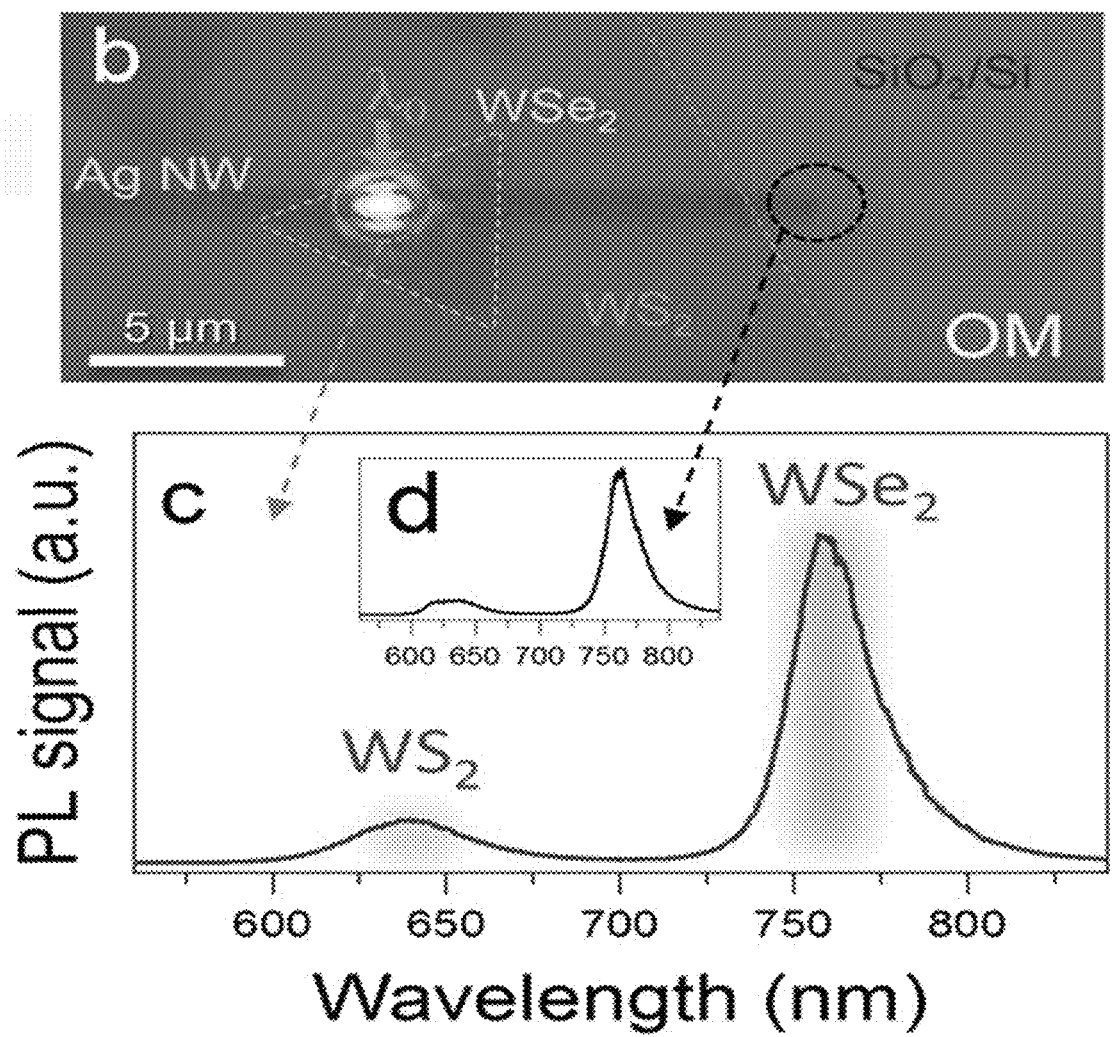
FIG. 3B shows a photoluminescence (PL) image for the wavelength multiplexing device in FIG. 3A and a graph of a photoluminescence signal (PL signal) based on a wavelength for the wavelength multiplexing device in FIG. 3A.

FIG. 3A is a conceptional view for illustrating a wavelength multiplexing device in accordance with one embodiment of the present disclosure. FIG. 3B shows a photoluminescence (PL) image for the wavelength multiplexing device in FIG. 3A and a graph of a photoluminescence signal (PL signal) based on a wavelength for the wavelength multiplexing device in FIG. 3A.

Referring to FIG. 3A, a wavelength multiplexing device 3000 may include a metal nano-structure 310, a light source 320, a first material layer 330, and a second material layer 340.

The first material layer 330 may be made of a first semiconductor material in which first excitons may be induced therein. The second material layer 340 may be made of a second semiconductor material in which second excitons may be induced therein. Each of the first material layer 330 and second material layer 340 may be in the form of a thin film having an atomic layer thickness. Each of the first material layer 330 and second material layer 340 may include at least one selected from a group consisting of a transition metal dichalcogenide-based compound, a chalcogenide-based semiconductor compound, a phosphorus-containing chalcogenide-based semiconductor compound, and a phosphorus-containing semiconductor compound. In one example, the first material layer 330 may be made of tungsten disulfide (WS$_2$) while the second material layer 340 may be made of tungsten diselenide (WSe$_2$). However, the present disclosure may be limited thereto. The first material layer 330 and second material layer 340 may be stacked on top of another. In one example, the second material layer 340 may be disposed on the first material layer 330 as shown in FIG. 3A.

The metal nano-structure 310 may be disposed on the second material layer 340. In one example, the metal nano-structure 310 may be embodied as silver (Ag) nano-wires. However, the present disclosure is not limited thereto. Various metals may be employed for the nano-wires. In one example, the metal nano-structure 310 may be embodied as metal nano-rods. The elongate metal nano-structure 310 may extend across the second material layer 340.

The light source 320 may emit laser light with a wavelength $\lambda_0$ which in turn, may be incident on a first region of the metal nano-structure 310 wherein the first region may overlap the first material layer 330 and second material layer 340. In one example, the wavelength $\lambda_0$ may be 514 nm.

The laser light may induce first excitons in the first material layer 330 and second excitons in the second material layer 340, and may generate surface plasmon polaritons in the first region. Then, the first and second excitons may be coupled with the surface plasmon polaritons in the first region to form first coupled surface plasmon polaritons which in turn, may propagate along the surface of the metal nano-structure 310.

In one example, each of the first excitons may have a first wavelength $\lambda_1$, while each of the second excitons may have a second wavelength $\lambda_2$ different from the first wavelength. In one example, the second wavelength may be larger than the first wavelength.

The first coupled surface plasmon polaritons may propagate along the surface of the metal nano-structure 310 while different wavelengths thereof are multiplexed. Thus, the first coupled surface plasmon polaritons may be scattered on a longitudinal end of the metal nano-structure 310 to be decoupled into first light with the first wavelength and second light with the second wavelength. Thus, the first coupled surface plasmon polaritons may be demultiplexed into the first light with the first wavelength and the second light with the second wavelength. In this way, the first light with the first wavelength and second light with the second wavelength may be collected individually. The collected first light with the first wavelength and second light with the second wavelength may be employed for corresponding communications.

In FIG. 3B, an upper image indicates a photoluminescence (PL) image for the wavelength multiplexing device in FIG. 3A, while a lower graph indicates a graph of a photoluminescence signal (PL signal) based on a wavelength for the wavelength multiplexing device in FIG. 3A. In the lower graph, a large graph c indicates a photoluminescence signal (PL signal) based on the wavelength in the first region onto which the laser is incident, while a small graph d indicates a photoluminescence signal (PL signal) based on the wavelength in the second region as a right longitudinal end of the nano-structure 310.

Referring to FIG. 3B, the large graph c indicating a photoluminescence signal (PL signal) based on the wavelength in the first region onto which the laser is incident may be identical with the small graph d indicating a photoluminescence signal (PL signal) based on the wavelength in the second region as a right longitudinal end of the nano-structure 310. In other words, a photoluminescence signal (PL signal) based on the wavelength in the first region where the sliver nano-wire, the first material layer 330 made of tungsten disulfide ($WS_2$) and the second material layer 340 made of tungsten diselenide ($WSe_2$) vertically overlap may be identical with a photoluminescence signal (PL signal) based on the wavelength in the second region as a right longitudinal end of the nano-structure 310. This means that the wavelength multiplexing may be achieved when the first and second material layers 330 and 340 may vertically overlap with each other.

Figure 4:
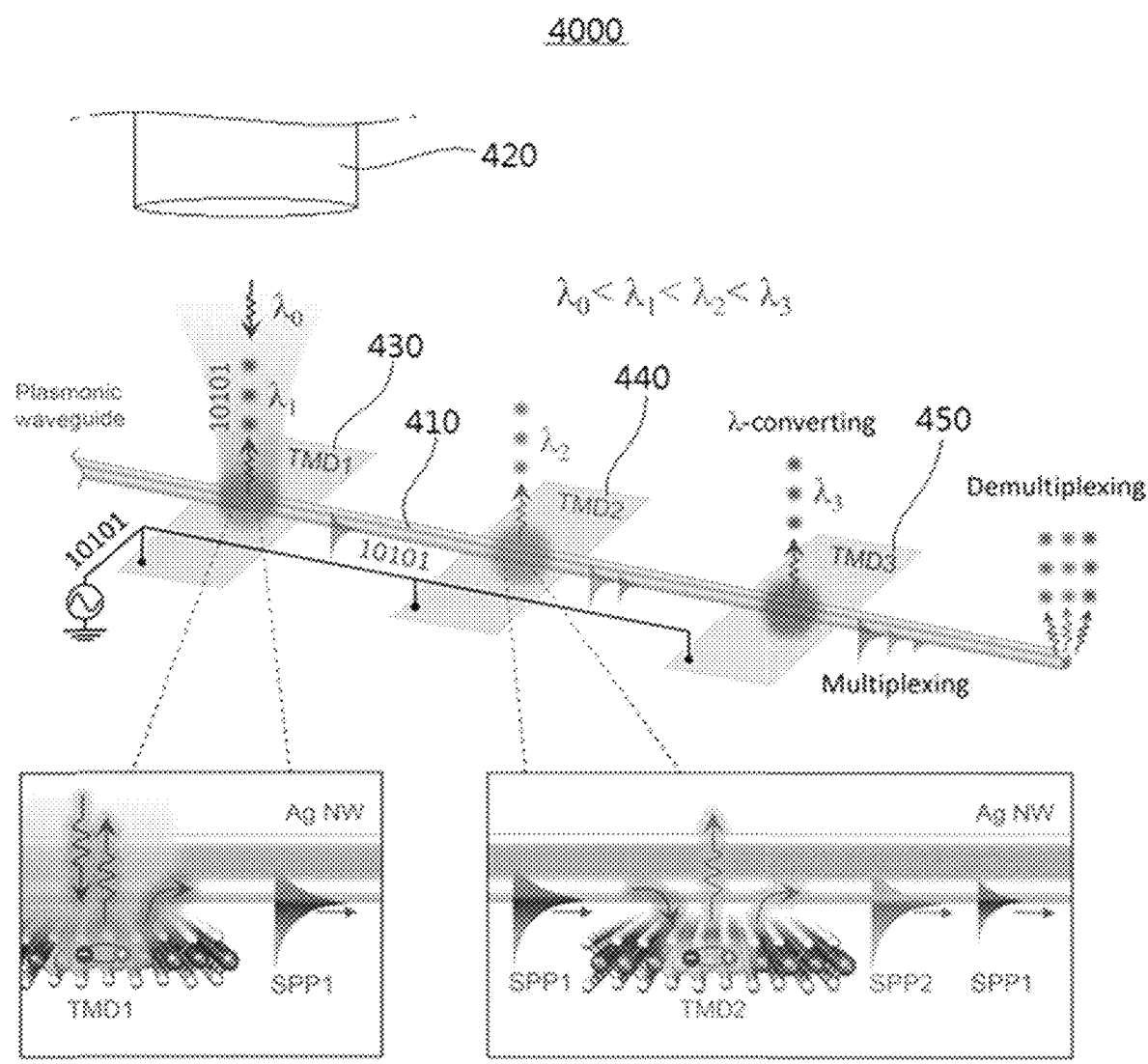
FIG. 4 is a conceptional view for illustrating a wavelength multiplexing device in accordance with one embodiment of the present disclosure.

FIG. 4 is a conceptional view for illustrating a wavelength multiplexing device in accordance with one embodiment of the present disclosure. Referring to FIG. 4, a wavelength multiplexing device 4000 may include a metal nano-structure 410, a first material layer 430, a second material layer 440, and a third material layer 450.

Each of the first material layer 430, the second material layer 440 and the third material layer 450 may be made of a semiconductor material in which excitons may be induced therein. The first material layer 430, the second material layer 440 and the third material layer 450 may be horizontally spaced from each other. Each of the first material layer 430, the second material layer 440 and the third material layer 450 may include at least one selected from a group consisting of a transition metal dichalcogenide-based compound, a chalcogenide-based semiconductor compound, a phosphorus-containing chalcogenide-based semiconductor compound, and a phosphorus-containing semiconductor compound. In one example, the first material layer 430 may be made of molybdenum disulfide ($MoS_2$), the second material layer 440 may be made of tungsten diselenide ($WSe_2$), and the third material layer 450 may be made of tungsten disulfide ($WS_2$). However, the present disclosure may be limited thereto. Each of the first material layer 430, the second material layer 440 and the third material layer 450 may be in the form of a thin film having an atomic layer thickness.

Each of the first material layer 430, the second material layer 440 and the third material layer 450 may induce therein first, second, and third excitons therein when the voltage is applied thereto. Each of the amounts of the first, second, and third excitons induced therein may be adjusted by the voltage applied thereto.

The metal nano-structure 410 may be disposed on the first material layer 430, the second material layer 440 and the third material layer 450. In one example, the metal nano-structure 410 may be embodied as silver (Ag) nano-wires. However, the present disclosure is not limited thereto. Various metals may be employed for the nano-wires. In one example, the metal nano-structure 410 may be embodied as metal nano-rods. The metal nano-structure 410 may extend across the first material layer 430 and then the second material layer 440 and then the third material layer 450. In other words, the metal nano-structure 410 may partially overlap the first material layer 430 and then the second material layer 440 and then the third material layer 450 respectively.

The light source 420 may emit laser light with a wavelength $\lambda_0$ which in turn, may be incident on a first region of the metal nano-structure 410 wherein the first region may overlap the first material layer 430. The laser light may induce the first excitons in the first material layer 430 and may generate surface plasmon polaritons in the first region. Then, the first excitons and surface plasmon polaritons may be coupled with each other in the first region to form first coupled surface plasmon polaritons (SSP1) which in turn, may propagate along the surface of the metal nano-structure 410.

Then, the first coupled surface plasmon polaritons may be absorbed by the second material layer 440 and, thus, the second excitons may be induced in the second material layer 440. Then, the second excitons and first coupled surface plasmon polaritons may be coupled with each other to form second coupled surface plasmon polaritons (SSP2) which in turn, may propagate along the surface of the metal nano-structure.

Subsequently, the second coupled surface plasmon polaritons may be absorbed by the third material layer 450 and, thus, the third excitons may be induced in the third material layer 450. Then, the third excitons and second coupled surface plasmon polaritons may be coupled with each other to form third coupled surface plasmon polaritons (SSP3) which in turn, may propagate along the surface of the metal nano-structure.

In one example, each of the first excitons may have a first wavelength $\lambda_1$, while each of the second excitons may have a second wavelength $\lambda_2$ different from the first wavelength, while each of the third excitons may have a third wavelength $\lambda_3$ different from the first and second wavelengths. In one example, the second wavelength may be larger than the first wavelength while the third wavelength may be larger than the second wavelength. Each of the first, second, and third wavelengths may be determined by each of bandgaps of the first, second, and third material layers 430, 440 and 450. Thus, Each of the first, second, and third wavelengths may be adjusted by changing the type of the transition metal dichalcogenide-based compounds forming the first, second, and third material layers 430, 440 and 450 respectively.

The third coupled surface plasmon polaritons may propagate along the surface of the metal nano-structure 410 while different wavelengths (the first to third wavelengths) thereof are multiplexed. Thus, the third coupled surface plasmon polaritons may be scattered on a longitudinal end of the metal nano-structure 410 to be decoupled into first light with the first wavelength, second light with the second wavelength and third light with the third wavelength. Thus, the third coupled surface plasmon polaritons may be demultiplexed into the first light with the first wavelength, the second light with the second wavelength, and the third light with the third wavelength. In this way, the first light with the first wavelength, the second light with the second wavelength and the third light with the third wavelength may be collected individually. The collection of the first to third wavelengths $\lambda_1$, $\lambda_2$, and $\lambda_3$ may be employed for corresponding communications.

In accordance with the present disclosure, it is possible to generate the multiplexed wavelength using the light source. The present disclosure can overcome the light diffraction limitation by using the surface plasmon polaritons. The present disclosure has an effect of being applicable to light communication.

Example for Production of Wavelength Multiplexing Device

Pieces of mono-molecule layers made of molybdenum disulfide ($MoS_2$), tungsten disulfide ($WS_2$) and tungsten diselenide ($WSe_2$) respectively are synthesized by a vapor phase reaction method. The pieces of the mono-molecule layers are transferred onto a silicon wafer having a silicon oxide thickness of 300 nm formed thereon. Then, isopropyl alcohol solution containing dispersion of silver nano-wires, each wire having a diameter of 200 nm or less, is transferred onto the pieces of the mono-molecule layers and is dried under an atmospheric condition.

The electrical connections to the pieces of the mono-molecule layers are fabricated by metal evaporation of chrome/gold (thickness 10/50 nm) and electron-beam lithography patterning method. A back gate bias ($V_G$) is applied to the silicon wafer.

To protect the nanowires under the atmospheric condition, the nanowires surfaces are coated with a protective layer made of poly(methylmethacrylate) 400 nm or less thick.

The above description is not to be taken in a limiting sense, but is made merely for the purpose of describing the general principles of exemplary embodiments, and many additional embodiments of this disclosure are possible. It is understood that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

What is claimed is:

1. A wavelength multiplexing device comprising:
   a first material layer made of a first semiconductor material;
   a second material layer made of a second semiconductor material, wherein the first material layer is spaced from the second material layer;
   an elongate metal nano-structure having first and second opposing longitudinal ends, wherein the elongate metal nano-structure extends across and on the first and second material layers;
   a light source configured to irradiate light onto a first region of the metal nano-structure, wherein the first region overlaps the first material layer,
   wherein when the light is irradiated on the first region of the metal nano-structure, surface plasmon polaritons are generated on the first region of the metal nano-structure, and first excitons are induced in the first material layer,
   wherein the surface plasmon polaritons and the first excitons are coupled with each other to form first coupled surface plasmon polaritons,
   wherein the first coupled surface plasmon polaritons propagate along and on a surface of the metal nano-structure,
   wherein when the first coupled surface plasmon polaritons reach the second material layer, second excitons are induced in the second material layer,
   wherein the second excitons and the first coupled surface plasmon polaritons are coupled with each other to form second coupled surface plasmon polaritons, and
   wherein the second coupled surface plasmon polaritons propagate along and on a surface of the metal nano-structure.

2. The device of claim 1, wherein each of the first excitons has a first wavelength, and
   wherein each of the second excitons has a second wavelength different from the first wavelength.

3. The device of claim 2, wherein the second coupled surface plasmon polaritons are decoupled at one of the first and second longitudinal ends of the metal nano-structure into first light with the first wavelength and second light with the second wavelength.

4. The device of claim 1, further comprising a semiconductor substrate having an insulating film formed thereon,
   wherein the first and second material layers are disposed on the insulating film.

5. The device of claim 4, wherein a voltage is applied to the substrate.

6. The device of claim 1, wherein each of the first and second layers is electrically grounded.

7. The device of claim 5, wherein an amount of the induced first and/or second excitons is adjusted by the voltage applied to the substrate.

8. The device of claim 1, wherein each of the first and second material layer is in a form of a thin film having an atomic layer thickness.

9. The device of claim 1, wherein each of the first and second semiconductor material includes at least one selected from the group consisting of a transition metal dichalcogenide-based compound, a chalcogenide-based semiconductor compound, a phosphorus-containing chalcogenide-based semiconductor compound, and a phosphorus-containing semiconductor compound.

10. A wavelength multiplexing device comprising:
    a first material layer made of a first semiconductor material;
    a second material layer made of a second semiconductor material, wherein the first material layer is spaced from the second material layer;
    a third material layer made of a third semiconductor material, wherein the third material layer is spaced from the second material layer, and the second material layer is disposed between the first and third material layers;

an elongate metal nano-structure having first and second opposing longitudinal ends, wherein the elongate metal nano-structure extends across and on the first, second and third material layers;

a light source configured to irradiate light onto a first region of the metal nano-structure, wherein the first region overlaps the first material layer, wherein when the light is irradiated on the first region of the metal nano-structure, surface plasmon polaritons are generated on the first region of the metal nano-structure, and first excitons are induced in the first material layer, wherein the surface plasmon polaritons and the first excitons are coupled with each other to form first coupled surface plasmon polaritons, wherein the first coupled surface plasmon polaritons propagate along and on a surface of the metal nano-structure, wherein when the first coupled surface plasmon polaritons reach the second material layer, second excitons are induced in the second material layer, wherein the second excitons and the first coupled surface plasmon polaritons are coupled with each other to form second coupled surface plasmon polaritons, wherein the second coupled surface plasmon polaritons propagate along and on a surface of the metal nano-structure, wherein when the second coupled surface plasmon polaritons reach the third material layer, third excitons are induced in the third material layer, wherein the third excitons and the second coupled surface plasmon polaritons are coupled with each other to form third coupled surface plasmon polaritons, wherein the third coupled surface plasmon polaritons propagate along and on a surface of the metal nano-structure.

11. The device of claim 10, wherein a voltage is applied to each of the first, second, and third material layers.

12. The device of claim 10, wherein each of the first excitons has a first wavelength, wherein each of the second excitons has a second wavelength different from the first wavelength, wherein each of the third excitons has a third wavelength different from the first and second wavelengths.

13. The device of claim 11, wherein an amount of the induced first, second and/or third excitons is adjusted by the voltage.

14. The device of claim 10, wherein the metal nano-structure has a protective coating formed on a surface thereof.

* * * * *